Patented May 25, 1926.

1,586,106

UNITED STATES PATENT OFFICE.

HELLMUTH MÜLLER-CLEMM, OF MANNHEIM, AND ERWIN SCHMIDT, OF MANNHEIM-WALDHOF, GERMANY, ASSIGNORS TO THE FIRM GESELLSCHAFT FÜR CHEMISCHE PRODUKTION M. B. H., OF MANNHEIM-WALDHOF, GERMANY, A CORPORATION OF GERMANY.

PROCESS FOR MAKING A HIGHLY-ACTIVE CHARCOAL IN GRAINS.

No Drawing.     Application filed October 24, 1924.    Serial No. 745,703.

It is known to produce an active charcoal by treating wood with caustic alkalis or alkali carbonates. The charcoal produced by this process will always be pulverulent, because the wood looses its structure during the heating stage. For this reason it has been proposed to subject the wood to a slight charring treatment before impregnating the same and to soak the charcoal thus formed with potash (see D. R. P. 309221).

The present invention consists in impregnating wood or other suitable vegetables with potassium sulphide or liver of sulphur and in heating to incandescence the material thus impregnated with exclusion of air in a known manner. We have made the surprising observation that wood when impregnated with potassium sulphide or polysulphides of potassium does not loose its structure during subsequent heating not even if the wood be impregnated with potash containing only a smaller portion of potassium sulphide. Moreover it has been shown by comparative experiments that the activity of the charcoal is increased in proportion with the potassium sulphide content (in presence or absence of potassium carbonate) over the activity of charcoal obtained by impregnation with the equivalent amount of potassium carbonate alone. The increased activity relates as well to the decolourizing capacity for coloured solutions, fats and oils as to the faculty of absorbing gases and vapours. The decolourizing capacity of a charcoal produced with potassium sulphide is 50% greater than that of one obtained with the equivalent amount of potassium carbonate. An important improvement of the invention consists in the above mentioned fact, that the decolourizing and the absorbing faculties are at the same time increased. Whereas hitherto a charcoal particularly suitable for absorbing gases or vapours used to be less effective as regards decolourizing action than a charcoal especially suitable for the latter purpose, the process according to the invention allows to obtain a charcoal of equal activity as regards both decolourizing and absorbing purposes and which is not surpassed by any charcoal which has hitherto been on sale. It renders the process particularly valuable that the fine dust which is produced at the same time as the granular material does not form a less useful waste-product but is a highly active pulverulent charcoal.

*Example.*

100 parts of wood, cork or other vegetables in granular form are impregnated with 30 parts of potash and 15 parts of potassium sulphide, heated to incandescence in a closed furnace and suddenly cooled with water, leached and if desired finally treated with hydrochloric acid. The final product is passed through sieves so as to obtain the desired size of the grains whereas the by-product is finely powdered and is used as valuable pulverulent coal.

The solution of potassium sulphide and carbonate regenerated by the leaching process is directly used for activating new portion of the material.

A modification of the process consists in impregnating for instance 100 parts of wood or the like with 30 to 40 parts of liver of sulphur or potassium sulphide and then treating the mass as above described.

What we claim is:

1. A process for making highly active charcoal in grains which comprises granulating vegetable substances, impregnating the said granulated substances with a potassium sulphide, and heating the impregnated material to incandescence with exclusion of air.

2. A process for making highly active charcoal in grains which comprises granulating wood, impregnating the same with a potassium sulphide, and heating the impregnated material to incandescence with exclusion of air.

3. A process for making highly active charcoal in grains which comprises granulating vegetable substances, impregnating the said substances with liver of sulphur, and heating the material thus treated to incandescence with exclusion of air.

4. A process for making highly active charcoal in grains which consists in granulating vegetable substances, impregnating the said substances with a potassium sulphide, in adding potassium carbonate and in heating the material thus treated to incandescence with exclusion of air.

5. A highly active granular charcoal which results from the process of granulating vegetable substances, impregnating the granulated substances with a potassium sulphide and heating the impregnated material to incandescence with exclusion of air.

6. A highly active granular charcoal which is made by granulating wood, impregnating the same with a potassium sulphide and heating the material thus treated to incandescence with exclusion of air.

7. A highly active granular charcoal which is made by granulating vegetable substances, impregnating the granulated substances with liver of sulphur, and heating the material thus treated to incandescence with exclusion of air.

8. A highly active granular charcoal which is made by granulating vegetable substances, impregnating the granulated substances with a potassium sulphide in adding potassium carbonate and in heating the material thus treated to incandescence with exclusion of air.

In testimony whereof we hereunto affix our signatures.

HELLMUTH MÜLLER-CLEMM.
ERWIN SCHMIDT.